United States Patent [19]

Gallagher

[11] Patent Number: 4,940,374

[45] Date of Patent: Jul. 10, 1990

[54] LOCKING BOLTS FOR VEHICLE EXHAUST MANIFOLD PIPES

[76] Inventor: Roy L. Gallagher, 13200 E. Harney La., Lodi, Calif. 95240

[21] Appl. No.: 261,717

[22] Filed: Oct. 24, 1988

[51] Int. Cl.$^5$ ............................................. F16B 39/10
[52] U.S. Cl. ................................... 411/120; 411/169; 411/192; 411/971; 411/985
[58] Field of Search ............... 411/83, 117, 119, 120, 411/124, 129, 131, 338, 356, 357, 166, 169, 191–194, 292, 956, 971, 973, 985, 998; 60/323

[56] References Cited

U.S. PATENT DOCUMENTS

| | | | |
|---|---|---|---|
| 403,132 | 5/1889 | Penrose | 411/166 |
| 973,470 | 10/1910 | Bogle | 411/998 X |
| 1,985,272 | 12/1934 | Adams | 411/166 |
| 2,370,944 | 3/1945 | Emerson | 411/119 |
| 2,409,907 | 10/1946 | Shakesby et al. | 411/965 X |
| 3,451,456 | 6/1969 | Dey | 411/998 X |
| 3,875,985 | 4/1975 | Okuda | 411/120 |
| 4,034,788 | 7/1977 | Melone | 411/134 |
| 4,185,937 | 1/1980 | Anderson | 411/166 X |
| 4,734,001 | 3/1988 | Bennett | 411/119 |

Primary Examiner—Lloyd A. Gall
Attorney, Agent, or Firm—Basil B. Travis

[57] ABSTRACT

An anti-rotation locking assembly for releasably fastening automotive exhaust pipes and exhaust manifolds to an engine block is disclosed comprising a threaded bolt with hex-wrenching recess and a hyperbolic locking plate with hex-stud which fits into the wrenching recess of the bolt and is attached thereto by cotter pin or Q clip. The locking plate has a contour which mates with said exhaust pipe and thereby prevents the bolt from working loose due to vibration of the engine.

2 Claims, 2 Drawing Sheets

LOCKING BOLTS FOR VEHICLE EXHAUST MANIFOLD PIPES

BACKGROUND OF THE INVENTION

1. Field of the Invention

This invention relates generally to threaded fasteners, such as bolts, and, more particularly, to an anti-rotation locking assembly for a threaded bolt with hexagonal wrenching recess which has particular use in mounting an exhaust manifold or modified exhaust pipes to the block of an automotive engine where there is very little clearance between the projected surface of the exhaust pipe and the head of the bolt.

2. Disclosure of the Relevant Known Prior Art

A number of techniques have been described to prevent bolts from working loose due to vibration. For example, in U.S. Pat. No. 4,734,001 (1988), Bennett discloses a threaded fastener with detachable locking plate of generally teardrop shape axially retained on the head of a bolt by an E clip whereby the plate prevents rotation of the bolt by abutting a stationary object. The problem with Bennett's invention for use on automotive exhaust manifolds and exhaust pipes is that there is generally not enough clearance between the projected surface of the exhaust pipe and the head of the bolt to accommodate Bennett's locking plate because the locking plate surrounds the head of the bolt and thus increases its diameter.

In U.S. Pat. No. 4,185,937 (1980), Anderson discloses a bolt with cylindrical threaded portion and integrally connected to an enlarged circular headed portion with hexagonal wrenching recess and elastically deformable annular ring spaced apart from the enlarged head portion, co-axially therewith, and secured thereto by axially extending connecting fingers. Although Anderson's device is applicable to limited access environments, such as turbine engines, it would be extremely impractical to use his fastener on exhaust manifolds primarily due to the lack of a suitable tool for deforming the annular ring to accommodate the shape of each exhaust pipe it engages.

Other fasteners are similarly described in the prior art, but none are known for use in automotive exhaust manifolds.

OBJECTS OF THE PRESENT INVENTION

Accordingly, it is the general object of the present invention to provide a bolt having a positive locking means abutting and held into a locked position by the conforming shape of the exhaust pipe it engages.

It is another object of the present invention to provide a threaded bolt detachably connected to its locking means.

It is yet another object of the present invention to provide a threaded bolt with hexagonal wrenching recess for connecting an exhaust manifold to an engine block where there is very little clearance.

It is still another object of the present invention to provide a detachable locking means between the hexagonal wrenching recess of the bolt and the projected surface of an exhaust pipe or exhaust manifold.

These and other objects will become apparent from the following specification and appended drawings which provide two types of bolts, Type (I) and Type (II) that essentially utilize the same mechanical principle to detachably fasten an automotive exhaust manifold or exhaust pipes to an engine block.

SUMMARY OF THE INVENTION

The present invention provides a contoured locking plate which mates with the abutting projected surface of an automotive exhaust pipe. The locking plate of both Type (I) and Type (II) fasteners is basically a hyperbola-shaped flat metal plate with detachable locking means engaging the hexagonal recess in the head of a bolt. In Type (I) locking plates, the flat metal hyperbolic plate contains a hexagonal projection extending into the head of said bolt where trans-axial holes in both the projection and bolt head may be aligned to receive a locking cotter pin. In Type (II) locking plates, a hole in the proximate center of said flat metal hyperbolic plate receives a pin extending co-axially and upwardly from the center of bolt head and through said plate where a clip (hereinafter known as a "Q" clip) trans-axially engages a groove at the tip of said pin thereby locking the plate to the bolt. It is believed that the patentable distinction of both Type (I) and Type (II) fasteners over the known prior art is not the manner by which the locking plate is attached to the bolt, but the way in which its hyperbolic shape engages the exhaust pipes and exhaust manifolds to prevent the bolt from working loose during vibration of the engine.

The primary advantage of the present invention over the prior art is that it is now possible to use hex-cap screws, instead of bolts, to attach automotive exhaust pipes and manifolds to engine blocks because it is only necessary to drill a hole trans-axially in the cap of the screw to receive a cotter pin and lock the co-axial hexagonal projection of the hyperbolic locking plate to the screw or bolt. In other words, the primary utility of the present invention over the prior art is that bolts with large hexagonal heads are no longer required as fasteners for automotive exhaust systems where it is difficult, if not impossible, to use wrenches and sockets externally on the hexagonal heads of the bolts due to lack of clearance. The present invention now makes it possible to use round heads of bolts and screws with a hexagonal wrenching recess where (hexagonal) Allen-type drill bits may be utilized to quickly assemble and disassemble exhaust systems.

The advantages of the present invention may be further understood by carefully reviewing the following preferred embodiments and appended drawings where like reference numerals refer to like elements.

DESCRIPTION OF THE PREFERRED EMBODIMENTS

Figure 1:
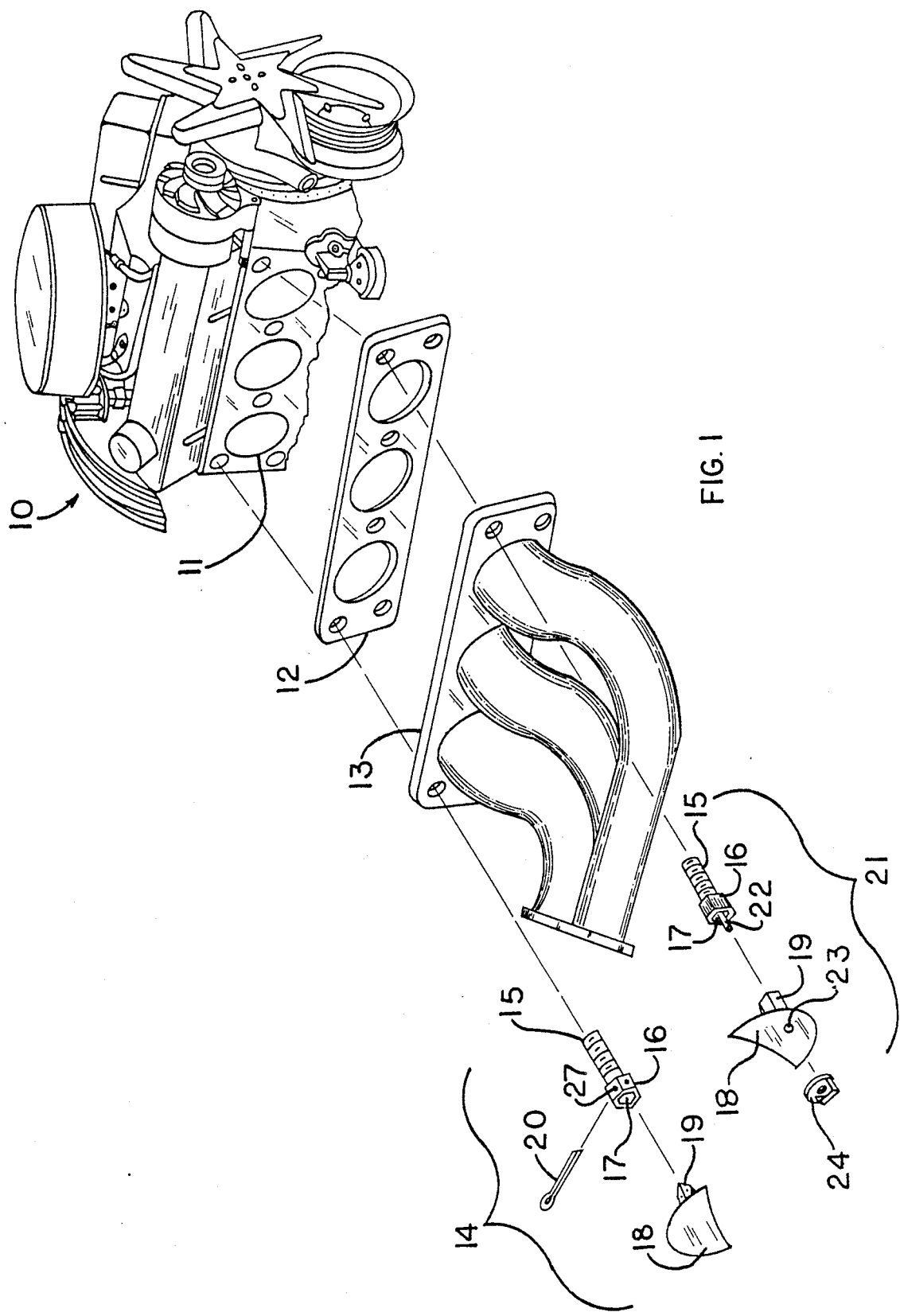
FIG. 1 is a partially cut-away and exploded illustration of an automobile engine with Type (I) and Type (II) locking bolts.

Referring first to FIG. 1, there is illustrated a typical automobile engine showing an engine block 10, exhaust ports 11, an exhaust manifold gasket 12 and exhaust manifold 13. It is recognized that several variations of engines and exhaust systems exist, but in virtually every case exhaust pipes are either directly connected in some manner to the engine block 10, or to a common manifold 13.

In any event, it is this point of attachment to the engine block 10 which required a threaded fastener. Traditionally, bolts have been used to attach headers to an engine block because common machine bolts have been used in engines since their origin and even more so today. However, the engines of old were less complicated and provided space for one to use a wrench to grip and turn a bolt. Today, that is not the case as it is very difficult to work on a modern automotive engine with standard tools. Moreover, modern engines have been the subject of a great deal of vibration. For example, it is not uncommon to hear complaints of bolts working loose due to vibration from today's smaller engines which must work harder. Then too, it is equally not uncommon to hear of complaints of improperly installed fasteners that work loose. FIG. 1 shows two fasteners of the present invention in a typical engine. Type (I) fastener, generally referred to as 14, comprises an elongated cylindrical threaded shaft 15, a head 16, a hexagonal wrenching recess 17, all of which allow the exhaust pipe to be easily installed or removed from the engine block 10. The flat metal hyperbolic plate 18 contains a co-axial hexagonal stud 19 to interface with the screw cap head 16 and holes 26 to receive a cotter pin 20. Thus, it is easily seen in Type (I) bolts that the locking device 18 is easily installed and removed by merely disengaging the cotter pin. This is believed to be a primary advantage over the lock-type washers of the prior art. FIG. 1 also illustrates the Type (II) fastener of the present invention, generally referred to as 21, which also comprises an elongated cylindrical threaded shaft 15, a head 16, a hexagonal wrenching recess 17, as in Type (I) above, however, the locking mechanism is different. In Type (II) fasteners, the flat metal hyperbolic plate 18, and co-axial hexagonal stud 19, is affixed to the screw cap head 16 by a co axially extending pin 22 which extends through a hole 23 in said plate 18 to receive a Q clip 24 to hold the assembly together. Thus, it can be seen that the only difference between Type (I) and Type (II) fasteners is the locking means by which the plate is held to the bolt.

Figure 2:
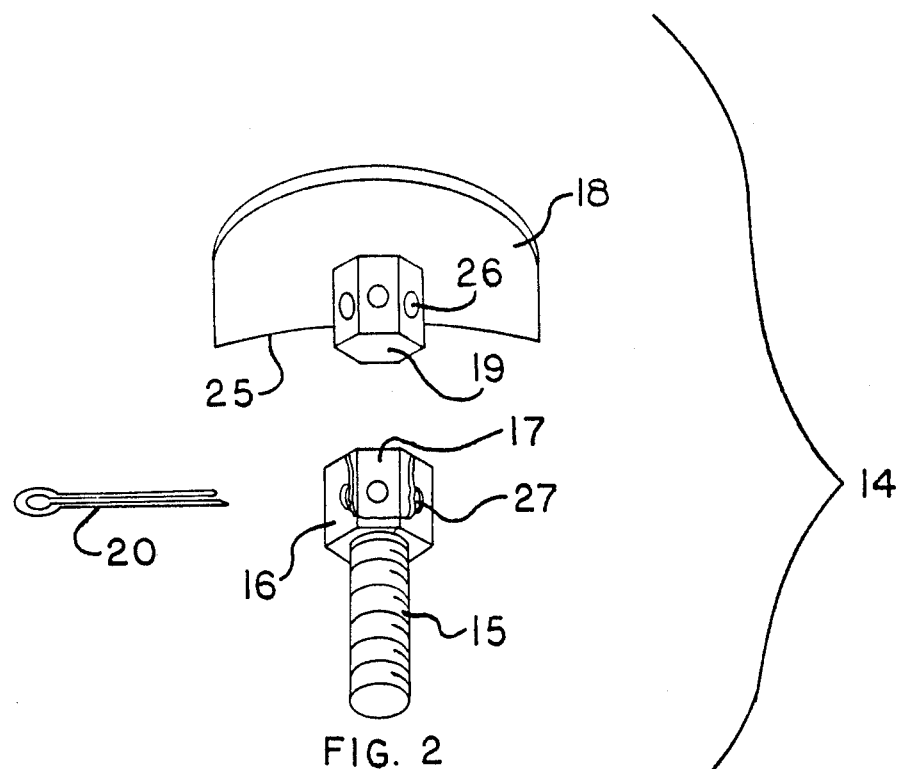
FIG. 2 is a partially cut-away and exploded view of the Type (I) locking bolt.

FIG. 2 is an exploded and cut-away view of the Type (I) fastener 14 of the present invention. It is illustrated here that any conventional hex-cap screw may be drilled trans-axially 27 to receive cotter pin 20 which locks the co-axial hexagonal stud 19 of the hyperbolic plate 18 into place. The hyperbolic plate 18 is easily made by cutting a piece of sheet metal so that its curved edge 25 will engage the contour of a projecting exhaust pipe. The hexagonal stud 19 may be cut from a section of commercially available hexagonal rod of proper size, and welded onto the surface of the hyperbolic plate 18, then drilled trans-axially 26 to receive a cotter pin 20. Thus, the Type (I) bolt 14 is locked into place by the cotter pin 20, and is disassembled by removing the pin.

Figure 3:
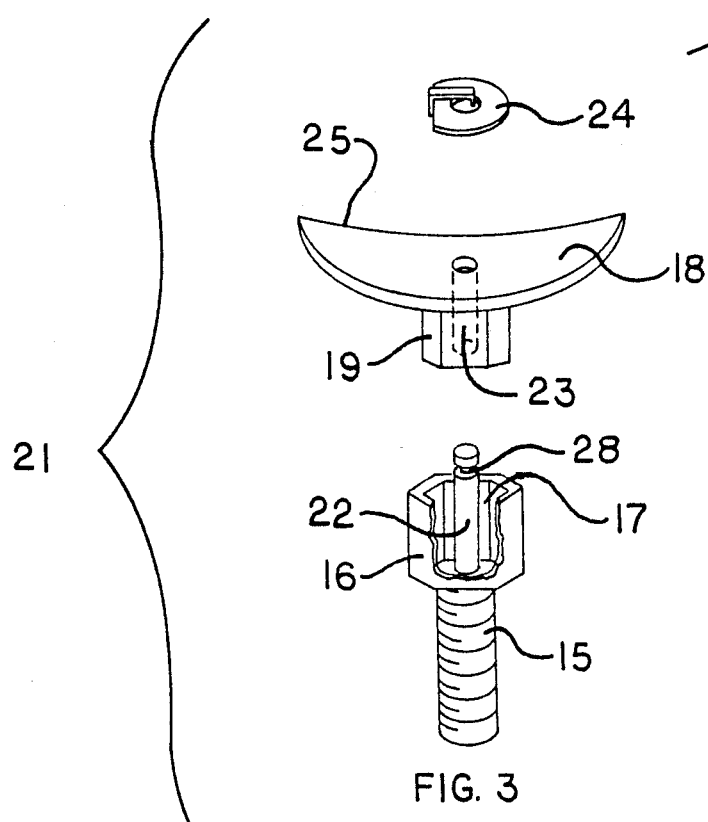
FIG. 3 is a partially cut-away and exploded view of the Type (II) locking bolt.

FIG. 3 is an exploded and cut-away view of the Type (II) fastener 21 of the present invention. The pin 22 has been welded co-axially from the center of the hexagonal wrenching recess 17 to extend through a hole 23 drilled co-axially through the hexagonal stud 19 and hyperbolic plate 18 where a notch 28 engages the Q clip 24, thus locking the assembly 21 into place.

While my invention has been described as Type (I) and Type (II) in a preferred embodiment, it should be understood that slight deviation in the specification may become necessary primarily due to various configurations of exhaust manifolds and exhaust pipes.

I claim:

1. An anti-rotation locking assembly for releasably fastening automotive exhaust pipes and exhaust manifolds to an engine block, said assembly comprising in combination:
   A. a generally cylindrical threaded shaft for engaging threaded holes in an automotive cylinder block;
   B. a headed portion proximate said threaded shaft further comprising:
      1. a hexagonal wrenching recess co-axial with said threaded shaft;
      2. a plurality of holes trans-axial of said threaded shaft;
   C. a locking plate of hyperbolic shape trans-axial of said threaded shaft and further comprising:
      1. a hexagonal stud extending co-axially from the proximate center of said locking plate to engage said headed portion;
      2. a plurality of holes in said stud, trans-axial of said threaded shaft receiving a cotter pin when the holes in the stud and headed shaft are aligned to securely lock the hyperbolic locking plate trans-axial to the threaded shaft and thereby prevent the threaded shaft from working loose due to vibration.

2. An anti-rotation assembly for releasably fastening automotive exhaust pipes and exhaust manifolds to an engine block, said assembly comprising in combination:
   A. a generally cylindrical threaded shaft for engaging threaded holes in an automotive cylinder block;
   B. a headed portion proximate said threaded shaft and further comprising:
      1. a hexagonal wrenching recess co-axial with said threaded shaft;
      2. a cylindrical pin projecting co-axially with and extending from said hexagonal wrenching recess, said pin having a circular notch in its end distal from said wrenching recess;
   C. a locking plate of hyperbolic shape trans-axial of said threaded shaft and further comprising:
      1. a hexagonal stud extending co-axially from the proximate center of said locking plate to engage said headed portion;
      2. a hole extending co-axially through said stud and said locking plate to allow passage of the pin from said wrenching recess;
   D. a clip of generally circular shape holding said assembly together during vibration of the engine.

* * * * *